United States Patent

[11] 3,608,645

[72] Inventor Elmo R. Meiners
 Anchor, Ill. 61720
[21] Appl. No. 781,062
[22] Filed Dec. 4, 1968
[45] Patented Sept. 28, 1971

[54] FARM TRAILER WITH LOAD BALANCING MEANS
 16 Claims, 6 Drawing Figs.
[52] U.S. Cl. .................................................. 172/491,
 111/7, 172/611, 280/150 C
[51] Int. Cl. ...................................................... A01b 25/00
[50] Field of Search .......................................... 172/611;
 111/7; 221/185; 222/176; 239/149, 142; 280/150 C; 248/128, 129

[56] References Cited
UNITED STATES PATENTS
225,640  3/1880  Prewitt .......................... 172/611

| 739,193 | 9/1903 | Lubin............................ | 172/611 |
| 2,247,680 | 7/1941 | Graham......................... | 172/611 X |
| 2,334,598 | 11/1943 | Bateman et al. ............... | 111/7 |
| 2,342,548 | 2/1944 | Lavoie........................... | 244/93 X |

FOREIGN PATENTS

| 14,782 | 10/1926 | Netherlands................. | 172/611 |
| 802,683 | 6/1951 | Germany...................... | 114/124 |

Primary Examiner—Clyde I. Coughenour
Attorney—Molinare, Allegretti, Newitt & Witcoff ABSTRACT: A fertilizer tank mounted on a two-wheeled frame with a tractor hitch includes the improvement of a hydraulically driven linkage for moving the tank forward and rearward on rails incorporated in the frame. The tank is moved on the frame to counterbalance implements that may be attached to the frame.

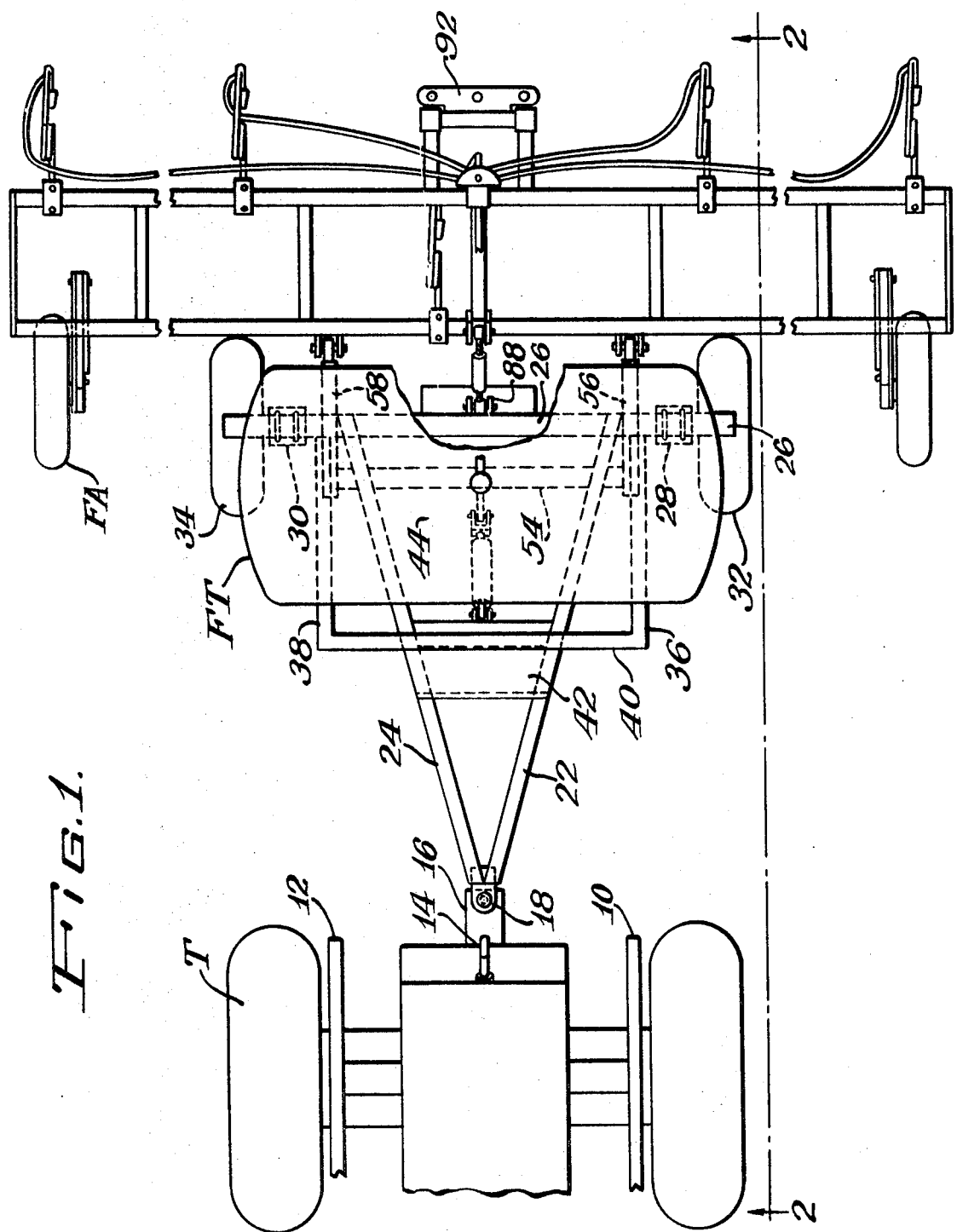

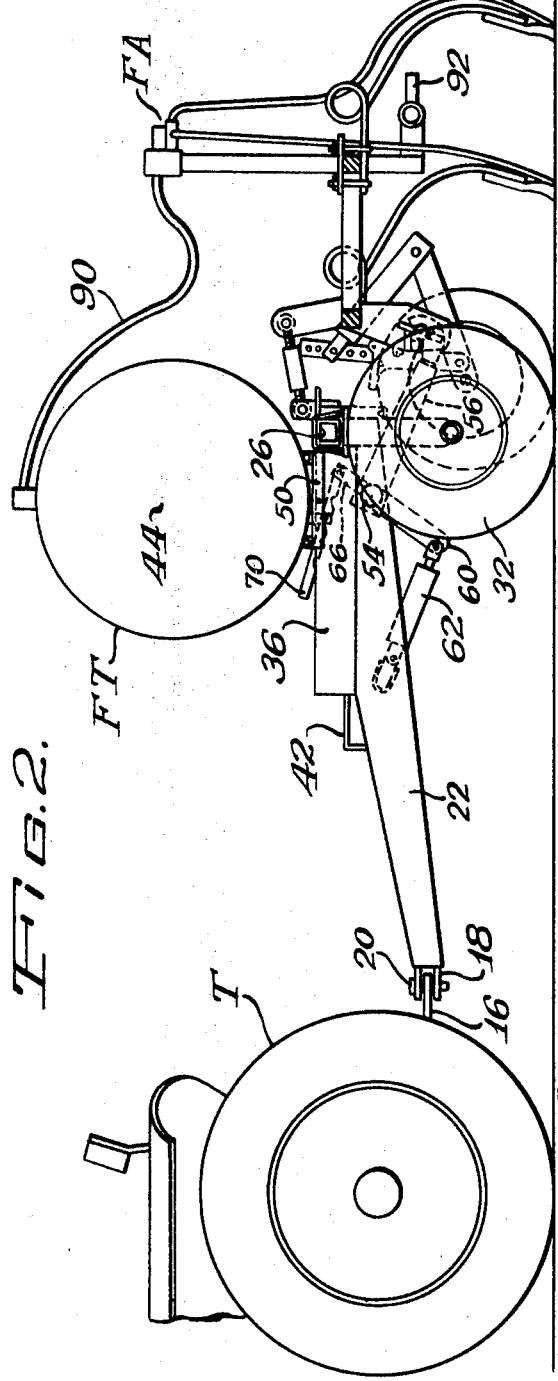
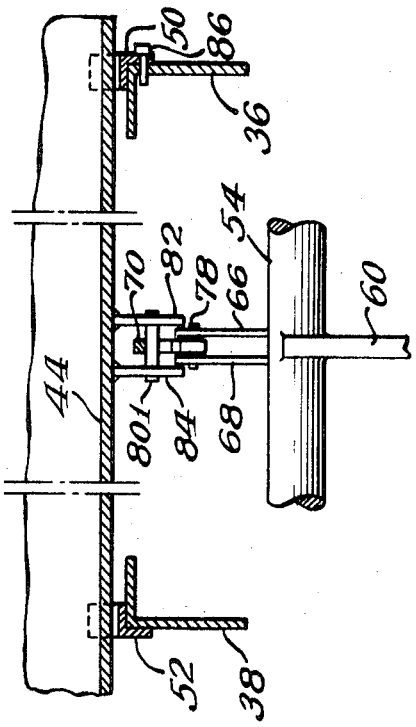
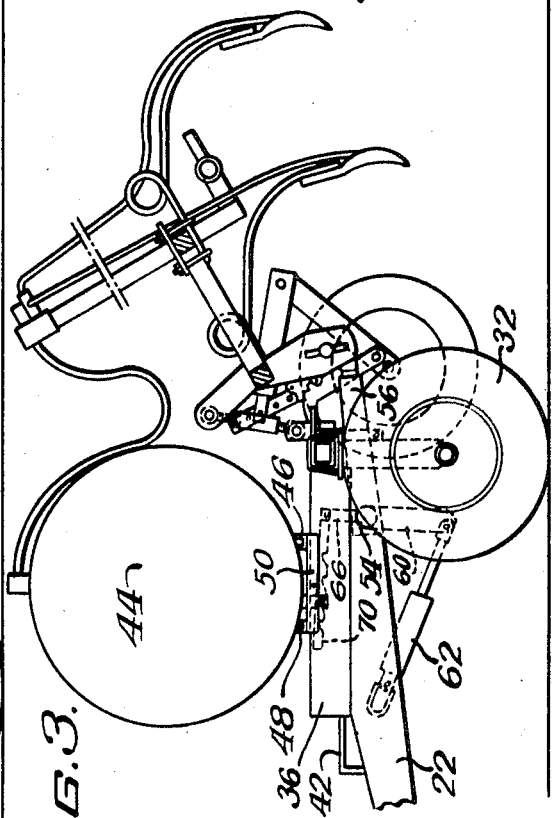

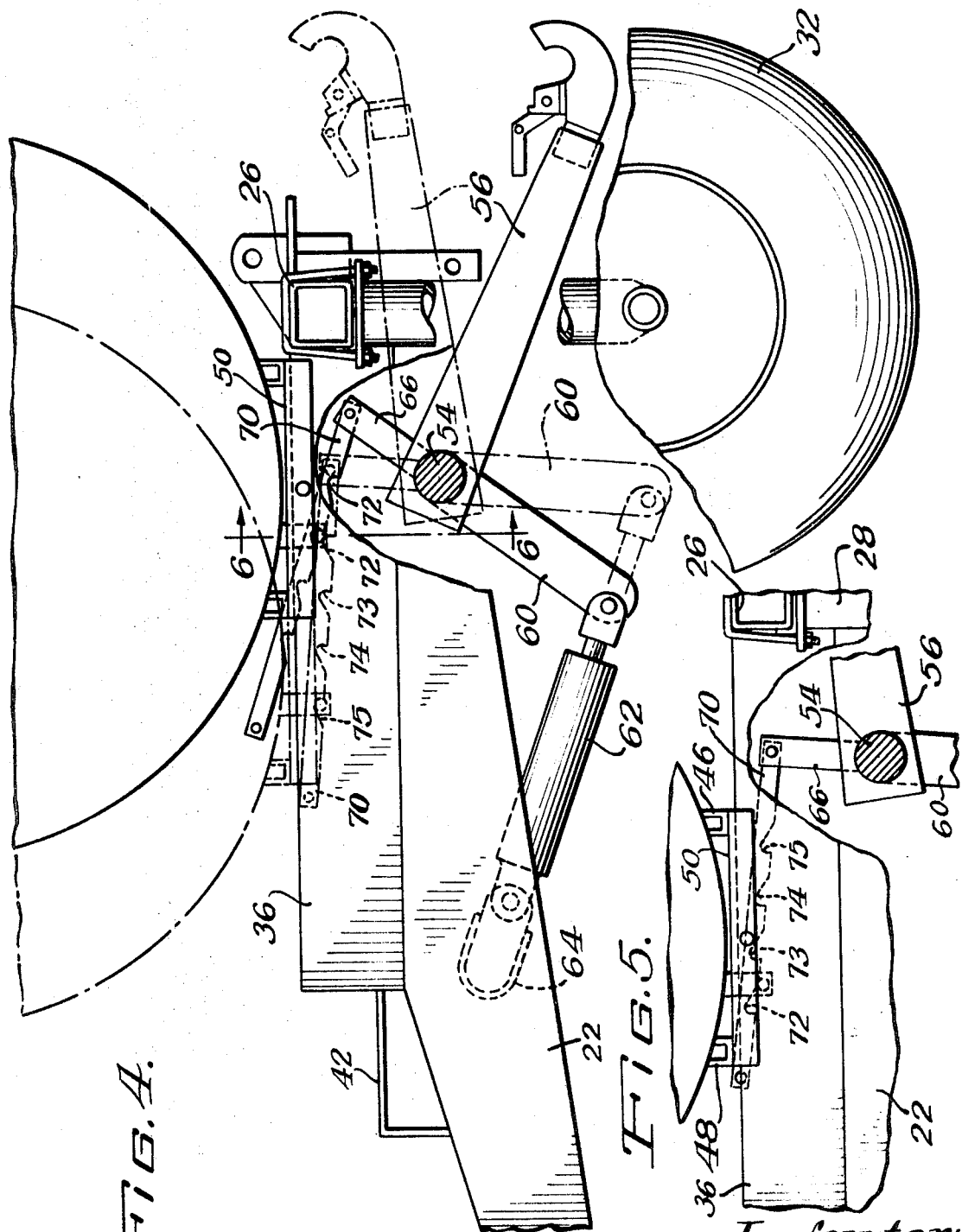

FARM TRAILER WITH LOAD BALANCING MEANS

BACKGROUND OF THE INVENTION

This invention relates to a trailer of the type including a frame with a forward hitch, an assembly mounted on the frame and wheels attached to the frame. In particular, this application relates to means for moving the assembly mounted on the frame to counterbalance the weight of implements attached to the frame.

Modern framing methods include the use of fertilizers to improve crop yields. Fertilizers are most often applied during the planting season and many fertilizers are in a liquid form. Liquid fertilizers are injected into the soil through hoses leading from a fertilizer tank mounted on a trailer behind a tractor.

Typically, a fertilizer tank is mounted on a frame having a pair of wheels and a forward hitch for attaching the rig to a tractor. A bladed implement for dispensing the liquid fertilizer into the ground is then attached to the rear of the fertilizer tank rig or trailer. In some cases, however, farmers prefer to attach the fertilizer applicator implement directly to the rear of the tractor and then pull the fertilizer tank trailer behind that implement. In either event the position of the fertilizer tank and its contents on the frame of the trailer in addition to any other attached implements determines the tongue weight (i.e., net weight acting in a vertical sense at the tractor hitch) of the fertilizer trailer.

It is desirable to have the tank positioned on the frame of the trailer so that the tongue weight is essentially eliminated. In other words, the tank and its contents should be positioned on the trailer frame so that the wheels of the trailer carry the downward weight or thrust of the trailer when the trailer is hitched. Keeping the tongue weight down makes it easier to attach the trailer to a tractor and also is much safer.

By attaching an implement at the rear of the trailer, the balance of the trailer is quite different from the instance when there are no attachments to the trailer. Attachments on the opposite or front side of the trailer also alter the balance. Moreover, different implements which have different weights will affect the balance of the trailer quite differently.

For this reason, it has been the practice of the farmers to attempt to move the fertilizer tank to a position on the trailer frame which most nearly counterbalances the placement of implements on that frame. To do this, however, is a time-consuming, dangerous and tedious chore. To eliminate these disadvantages and to provide an improved trailer unit is an object of the present invention.

SUMMARY OF THE INVENTION

In a principal aspect, the present invention comprises an improvement in a trailer of the type having a frame with a forward hitch, an assembly mounted on the frame and wheels also attached to the frame and means for moving the assembly on the frame to counterbalance the weight of implements or the like attached to the frame.

It is thus an object of the present invention to provide an improved trailer-type farm implement.

A further object of the invention is to provide an improved trailer which may be used for transporting a fertilizer tank which is precisely positioned on the trailer to counterbalance any implements or the like attached to the trailer.

Still another object of the present invention is to provide an economical and simplified means for positioning an assembly such as a fertilizer tank on the frame of a trailer at a desired, balanced position.

One further object of the present invention is to provide means for moving an assembly mounted on a trailer frame in either the forward or rearward direction on the frame.

These and other objects, advantages and features of the present invention will be set forth in greater detail below.

BRIEF DESCRIPTION OF THE DRAWINGS

In the detailed description which follows, reference will be made to the drawings comprised of the following Figures:

FIG. 1 is a plan view of the trailer of the invention attached to a tractor and with a fertilizer applicator attached to a three-point hitch at the rear of the trailer;

FIG. 2 is a side elevational view of the improvement of the present invention as shown in FIG. 1 taken substantially along the line 2—2;

FIG. 3 is a side elevation of the trailer with the three-point hitch of the trailer extended to raise the attached applicator;

FIG. 4 is an enlarged side elevation illustrating the linking mechanism utilized to move the fertilizer tank on the trailer frame and also raise and lower the three point hitch;

FIG. 5 is a detail view illustrating the position of the linkage mechanism for moving the fertilizer tank rearwardly on the frame of the trailer; and FIG. 6 is a cross-sectional view of the linkage mechanism taken substantially along the line 6—6 in FIG. 4.

DESCRIPTION OF THE PREFERRED EMBODIMENT

In the accompanying drawings, the reference character T refers generally to a tractor; the character FT refers to a wheel-mounted fertilizer tank or trailer, and the reference character FA to a fertilizer applicator used in conjunction with the fertilizer tank trailer, FT. Also in the following description, the preferred embodiment is described as being incorporated as part of a fertilizer tank trailer, FT. The invention, however, may be utilized and incorporated as part of any trailer of the type including a frame having a mounted assembly and attached wheels. The present invention thus provides means for moving the assembly on the frame to provide a desired balance of the trailer and attachments.

Referring now to FIGS. 1 and 2, there is shown a tractor T which includes a three-point hitch comprised of a pair of lower arms 10 and 12 and an upper arm 14. Farm implements of any suitable type such as a corn planter, a seeder, a harrow, a disc-harrow, a rotary, or the like may be attached to the three-point hitch on the tractor to be raised and lowered as desired. The tractor T also includes a tractor pull tongue 16. A pull hitch, for example, pull hitch 18 of the fertilizer tank FT, may be connected to the tractor pull tongue 16 by means of a pin 20. Of course, other farm implements may also be attached to hitch 16.

The trailer FT includes first and second pull hitch members 22 and 24 which are welded together at the pull hitch 18 and extend rearwardly to connect with a box beam axle member 26. Attached to the axle member 26 at the opposite ends thereof are wheel mountings 28 and 30, respectively. Wheels 32 and 34 are attached to the mountings 28 and 30, respectively. The mountings 28 and 30 may be adjusted on the axle member 26 to accommodate various row widths.

Extending forward from the axle member 26 are first and second frame rails 36 and 38 respectively which, when the trailer FT is attached to a tractor, define a substantially horizontal plane. The rails 36 and 38 are interconnected at their forward end by a cross member 40. A sheet metal platform 42 is positioned across the pull hitch members 22 and 24 forward of the cross member 40. The platform 42 provides an area on which a compressor may be mounted to facilitate discharge of liquid fertilizer from a fertilizer tank 44.

The tank 44 as illustrated in FIGS. 2, 3, 4 and 5 is mounted on a carriage comprised of a pair of cross braces 46 and 48 welded to the bottom of tank 44 and first and second tracks 50 and 52 welded to the braces 46 and 48. The tracks 50 and 52 ride respectively on the first and second rails 36 and 38. This is also illustrated in FIG. 6.

Mounted in bearings in the pull hitch members 22 and 24 is a rotatable shaft 54. First and second lower arms 56 and 58 of a three-point hitch of the trailer FT are attached to the opposite ends of the shaft 54. A lever arm 60 is fixed substantially at the center of the shaft 54. The arm 60 is driven by a hydraulic cylinder 62 pinned at one end through the lever arm 60 and at its opposite end to a crossbeam 64 extending between hitch members 22 and 24. Also welded to the shaft 54 as straight line extensions of the lever arm 60 are first and second extension arms 66 and 68. A tank drive plate 70 having a plurality of notches 72 through 75 therein is attached by means of a removable pin 78 between the arms 66 and 68.

A notch, for example, notch 72 of the notched plate 70 engages a pin 80 connected between brackets 82 and 84 welded to the tank 44. To drive the tank forward on the frame rails 36 and 38, the hydraulic cylinder 62 is extended to the phantom position shown in FIG. 4. Originally, when the tank 44 is in its most rearward position on the rails 36 and 38, notch 72 engages pin 80 and the expansion of the hydraulic cylinder 62 causes the tank 44 is in its most rearward on the rails 36 and 38 a single incremental space. Because the notches are inclined in the forward direction as as illustrated in FIG. 4, the hydraulic cylinder may then be withdrawn to the solid position as illustrated in FIG. 4 so that notch 72 will glide out of engagement with the pin 80 and notch 73 will then engage with the pin 80 as shown in FIG. 4. The sequence of operation is then repeated for each notch until the tank 44 is moved to a desired forward position.

To reverse the movement of the tank 44, the drive plate 70 is oriented in reverse. This is illustrated in FIG. 5. As seen in this Figure, the opposite end of the plate 70 is pinned between arms 66 and 68, and the notches 72 through 75 are inclined in the rearward direction so that the tank 44 is pulled along the rails 36 and 38 as the hydraulic cylinder 62 is closed. The rearward motion of the tank 44 is also provided in incremental steps.

Referring now to FIG. 6, a lock pin 86 is inserted through track 50 and its corresponding rail 36 to hold the tank 44 in a desired position once the tank has been moved. In operation then, the tank may be moved to a desired position and locked in that position. The driving plate 70 may remain or may be removed from the rig.

By way of illustration, the fertilizer applicator FA as illustrated in FIGS. 1, 2 and 3 may be attached to the lower arms 56 and 58 and an upper bracket 88. The arms 56 and 58 and bracket 88 serve as a three-point hitch at the rear of the trailer FT. Thus, a supply hose 90 may lead from the tank 55 to a fertilizer applicator FA positioned at the rear of the trailer FT. The applicator FA may be positioned on the three-point hitch 56, 58 and 88 to be raised and lowered by means of actuation of the hydraulic cylinder 62, rotating shaft 54, and attached arms 56 and 58 to the position illustrated in FIG. 3. For purposes of illustration, the fertilizer applicator FA illustrated in the Figures is a two bar applicator mounted on a pair of wheels. The type of applicator or, in fact, the implement attachable to the rear of the trailer FT, is not limited, however, to this type of device.

Positioned on the rear of the applicator FA is a pull hitch 92 to which there may be attached a harrow rake or other farm implement. Thus, as can be seen, the weight on the fertilizer trailer FT may vary considerably and the balance of the fertilizer trailer may change considerably depending upon the implements attached to the trailer FT, and also depending upon where and how the implements are attached to the trailer.

Since it is desirable to keep the trailer FT, attached applicator FA, and attached farm implements in balance on the wheels 32 and 34, it is also desirable to move the tank 44 and the contents of the tank to assure this balance.

By means of the present invention, the tank 44 can be easily moved by a single man in a short span of time of 5 to 15 minutes. A task of this type formerly required two men working up to 2 hours. It can also be seen that the hydraulic cylinder 62 serves a dual purpose of activating the three-point hitch of the trailer FT and of moving the tank 44 when desired in either direction depending upon the orientation of the plate 70.

I claim:

1. In a trailer of the type including a front-end hitch connected to a frame, a movable assembly mounted on said frame and wheels attached to said frame, the improvement comprising, in combination: at least one rail fixed on said frame, at least one track on said movable assembly, said track slidably positioned on said fixed rail to permit movement of said movable assembly, an assembly driving unit connected between said frame and said movable assembly for moving said movable assembly on said rail and adjusting the distribution of weight of said assembly on said frame, said unit including a rotatable shaft mounted in said frame substantially perpendicular to the direction of trailer travel, a lever arm fixed to said shaft, driving means for driving said lever arm and thereby rotating said shaft, a bracket also attached to said shaft and a notched plate driven by said bracket, said plate also engaging said assembly to move said assembly in response to rotation of said shaft.

2. The improvement of claim 1 including first and second rails on said frame arranged substantially parallel to the direction of trailer travel and also including first and second tracks riding respectively on said first and second rails.

3. The improvement of claim 1 wherein said plate includes a plurality of notches to engage said movable assembly.

4. The improvement of claim 1 wherein said driving means comprise an expandable piston connected between said frame and said lever arm.

5. The improvement of claim 1 wherein said bracket comprises an extension of said lever arm attached to said shaft and extending in a straight line from said lever arm.

6. The improvement of claim 1 wherein said notched plate is removable and reversible to change the direction of motion when driving said driven assembly.

7. The improvement of claim 1 wherein said assembly is a fertilizer tank.

8. The improvement of claim 1 including means for locking said track on said rail.

9. The improvement of claim 1 including a second hitch at the rear end of said frame for attachment of implements, said second hitch being drivingly connected with said shaft to raise and lower an implement attached to said second hitch.

10. In a trailer of the type including a front-end hitch connected to a frame, a movable assembly mounted on said frame and wheels attached to said frame, the improvement comprising, in combination: at least one rail fixed on said frame, at least one track on said movable assembly, said track slidably positioned on said fixed rail to permit movement of said movable assembly, an assembly driving unit connected between said frame and said movable assembly for moving said movable assembly on said rail and adjusting the distribution of weight of said assembly on said frame, said unit including a rotatable shaft mounted in said frame substantially perpendicular to the direction of trailer travel, a lever arm fixed to said shaft, driving means for driving said lever arm and thereby rotating said shaft, means connecting said shaft and said assembly to provided movement of said assembly on said rail in response to rotation of said shaft, and a second hitch at the rear of said frame for attachment of implements, said second hitch drivingly connected with said shaft to provide movement of an implement attached to said second hitch.

11. The improvement of claim 10 including first and second rails on said frame arranged substantially parallel to the direction of trailer travel and also including first and second tracks riding respectively on said first and second rails.

12. The improvement of claim 10 wherein said means connecting said shaft and said assembly include a bracket extending from said shaft and a notched plate having a plurality of notches, said plate connectable between said bracket and said assembly.

13. The improvement of claim 10 wherein said driving means comprise an expandable piston.

14. The improvement of claim 12 wherein said plate is removable and reversible to change the direction of motion when driving said assembly.

15. The improvement of claim 10 wherein said assembly is a fertilizer tank.

16. The improvement of claim 10 including means for locking said track on said rail.